United States Patent
Yonemura et al.

[11] Patent Number: 5,194,078
[45] Date of Patent: Mar. 16, 1993

[54] EXHAUST FILTER ELEMENT AND EXHAUST GAS-TREATING APPARATUS

[75] Inventors: Masaaki Yonemura, Nara; Takao Kusuda, Ashiya, both of Japan

[73] Assignee: Matsushita Electric Industrial Co., Ltd., Osaka, Japan

[21] Appl. No.: 853,899

[22] Filed: Mar. 19, 1992

Related U.S. Application Data

[63] Continuation of Ser. No. 658,126, Feb. 22, 1991, abandoned.

[30] Foreign Application Priority Data

Feb. 23, 1990 [JP] Japan .................................. 2-43022
Mar. 23, 1990 [JP] Japan .................................. 2-73739

[51] Int. Cl.⁵ .............................................. B01D 46/00
[52] U.S. Cl. .................................... 55/466; 55/523; 55/DIG. 30; 60/311; 60/275
[58] Field of Search ......... 55/282, 523, 466, DIG. 30, 55/208, 96; 60/311, 275; 219/10.5 M, 10.55 F, 10.55 E, 10.55 R; 428/312.2, 312.6, 310.5; 501/80

[56] References Cited

U.S. PATENT DOCUMENTS

| | | | |
|---|---|---|---|
| 4,364,760 | 12/1982 | Higuchi et al. ........................ | 55/523 |
| 4,652,286 | 3/1987 | Kusuda et al. ........................ | 55/523 |
| 4,659,348 | 4/1987 | Mayer .................................... | 60/311 |
| 4,704,863 | 11/1987 | Abthoff et al. ........................ | 55/487 |
| 4,902,319 | 2/1990 | Kato ...................................... | 60/311 |

FOREIGN PATENT DOCUMENTS

| | | | |
|---|---|---|---|
| 212396 | 3/1987 | European Pat. Off. . | |
| 327439 | 8/1989 | European Pat. Off. . | |
| 3024539 | 4/1982 | Fed. Rep. of Germany . | |
| 58-135169 | 8/1983 | Japan .................................... | 55/523 |
| 59-58114 | 4/1984 | Japan .................................... | 55/523 |
| 1-304022 | 12/1989 | Japan .................................... | 55/523 |

*Primary Examiner*—Bernard Nozick
*Attorney, Agent, or Firm*—Wenderoth, Lind & Ponack

[57] ABSTRACT

This exhaust filter element has a corrugated honeycomb structure made of the porous fibrous ceramics, of which cells are alternately plugged; and is made of material having a higher dielectric factor at an inflow side or an outer circumference portion than at an inside portion. The filter element can be regenerated by irradiation of micro wave after it is soiled by particulates in an exhausted gas.

15 Claims, 4 Drawing Sheets

EXHAUST FILTER ELEMENT AND EXHAUST GAS-TREATING APPARATUS

This application is a continuing application of now abandoned application Ser. No. 07/658,126, filed Feb. 22, 1991, now abandoned.

PRIOR ART

The present invention relates to an exhaust filter element and an exhaust gas-treating apparatus using the filter element and being capable of removing particles contained in a gas exhausted from a Diesel engine and the like and incinerating said particulates so as to be regenerated.

A method of removing particulates contained in an exhaust gas by the use of a filter has been well investigated. That is to say, said particulars are caused by means of a ceramic honeycomb filter made of cordierite or fiber ceramic and the accumulated particulates are incinerated in situ. The firing by means of an electric heater, the incineration by means of a burner and the like have been used as incinerating means. On the other hand, a method of incinerating particulates by irradiating them from a micro wave has been proposed in German Patent No. 3024539. According to this method, a mat made of silica fibers is wound around a punched metal to form a filter and said filter is disposed in a gas exhausted from a Diesel engine to remove the particulates and additionally the accumulated particulates are irradiated with a micro wave through a wave guide provided in a filter vessel so as to be incinerated.

According to this method, said mat made of silica fibers is used as a material of the filter, so that said cylindrical punched metal is required as a support. In addition, it has been difficult to give a complicated shape to the filter and the filtering area of the filter is small in comparison with the volume of the apparatus and thus the filter is apt to be choked. Accordingly, also the pressure drop is increased and thus the particulates must be frequently incinerated. Moreover, the filter made of silica fibers has been very easily blown away by a stream of exhaust gas and damaged.

On the other hand, according to a method disclosed in Japanese Patent Application Laid-Open No. Sho 60-137413, a filter (for example of a honeycomb filter) is made of a material having a high dielectric constant and particulates are irradiated with a micro wave by means of a generator provided in said filter so as to be incinerated.

According to this method, the honeycomb filter is made of titanium oxide and thus the heat capacity of the filter is increased in the same manner as in a cordierite honeycomb. Accordingly, a long time is necessary to raise the temperature of said particulates up to an incineratable temperature and an increased consumption of energy has been required.

Furthermore, in case of a honeycomb filter, it is heated by the irradiation of a micro wave from its central portion, so that the particulates accumulated in the vicinity of the inlet face of the filter are left unincinerated. Accordingly, if the particulates are accumulated again under this condition, not only is the usable lifetime of the filter shortened, but also the amount of the sediments in the vicinity of said inlet is increased, so that at last an open portion of honeycomb is choked and thus the filter lacks long-term reliability.

SUMMARY OF THE INVENTION

The present invention provides an exhaust filter element in which an inflow side or an outer circumferential portion of said exhaust filter element having a ceramic honeycomb structure is made of a material having a high dielectric constant and this portion is irradiated with a micro wave to incinerate particulates caught at that portion, whereby regenerating.

DETAILED DESCRIPTION OF THE INVENTION

The present invention relates to an exhaust filter element having a ceramic honeycomb structure, in which adjacent cell ends are alternately plugged, wherein the filter element is made of a material having a higher dielectric constant at least a portion of an inflow side and/or an outer circumference portion than an inside portion.

In addition, the present invention relates to an exhaust gas-treating apparatus which comprises said exhaust filter element and a means for irradiation of the exhaust filter element with a micro wave to incinerate particulates accumulated on the exhaust filter element, thereby being regenerated.

Figure 1:
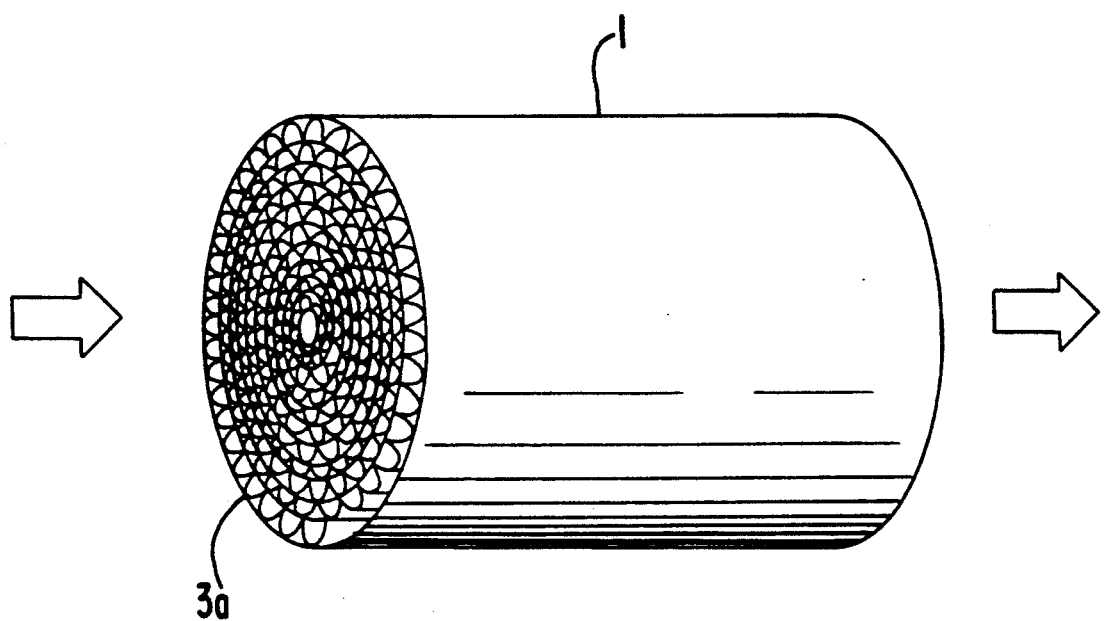
FIG. 1 is a perspective view of a main portion of an exhaust filter element according to one embodiment of the present invention.
Figure 2:
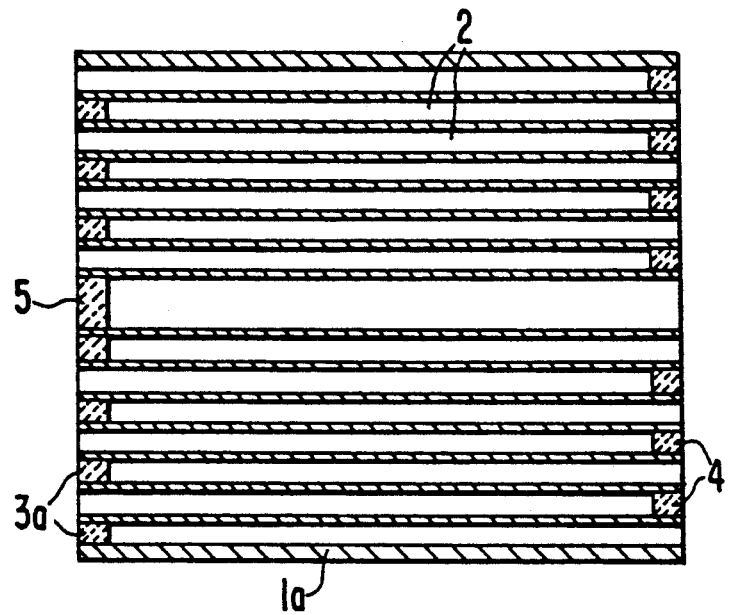
FIG. 2 is a rough sectional view of the exhaust filter element of FIG. 1.

One example of a construction of the exhaust filter element according to the present invention is shown in FIG. 1 and FIG. 2 (a longitudinal sectional view). Reference numeral 1 designates the filter element 1a designates a filter body, reference numeral 2 designating cells having a honeycomb structure, reference numeral 3a designating a plug on the inflow end for an exhaust gas, and reference numeral 4 designating a plug on the discharge end for the gas passed through the filter element.

In the exhaust filter element according to the present invention, said cells composing said ceramic honeycomb structure are alternately plugged at the ends thereof as shown in FIG. 2. The body 1a defining the cells is made of a suitable incombustible porous material. When the combustion gas is discharged outside through pores of said porous material, particles (mainly carbon particles), which are unburnt components, are caught by the porous material defining the cells. The caught particulates reduce the filtering efficiency of the filter element, so that they are continuously or intermittently incinerated to regenerate the filter element.

According to the present invention, this incineration is carried out by using a material having a high dielectric constant and irradiation with a micro wave.

The porous material composing the body defining the cells 2 used in the present invention includes materials obtained by sintering heat-resisting inorganic fibers, such as aluminosilicate fiber, aluminoborosilicate, silicate fiber, silica fiber, alumino fiber and rock wool, and the like together with clay such as selisite, kaolinite, silicic acid, magnesia and alumina insulating brick material, and the like. It is usually sufficient that said inorganic fibers and similar materials and said clay and similar materials are dispersed in water together with suitable high molecular adhesives, such as vinyl acetate-acrylonitrile copolymer emulsion, polyvinylalcohol and the like, and then subjected to a paper-manufacturing process, thereby obtaining a sheet, and the honeycomb structure of body 1a is produced from said sheet.

A material having a dielectric constant higher than that of said material of the honeycomb structure can be obtained by adding various kinds of micro wave dielectric ceramic material, such as silicon carbide, titanium oxide, zinc oxide and alkaline earth metal titanate (for example strontium titanate and barium titanate), to the above-described heat-resisting inorganic fibers and clay and similar material, and subjecting the resulting mixture to a paper-manufacturing process or molding together with an organic binding agent in the same manner as in the above-described body material followed by firing, and then sintering at a high temperature of from about 1000° C. to about 1400° C.

It is preferable that the dielectric ceramic be used in an amount of from 10% to about 50% by weight, preferably about 15% to about 30% by weight, based on the total amount of the inorganic fibers, clay and similar material and the dielectric ceramic material. In the case where the dielectric ceramic material is incorporated in only the plug material on the inflow side, it is used in an increased amount. In the case where the dielectric ceramic material is incorporated in the inflow side of the body of making up the honeycomb structure, its amount may be gradually reduced toward the discharge side. It is usually preferable that the dielectric constant be gradually reduced over a length of from about 5% to about 50%, preferably from about 10% to about 30%, of the total length of the exhaust filter element. In addition, the dielectric constant may be gradually reduced from the outermost circumference to the inside. In this case, it is preferable that the dielectric constant be gradually reduced from about 5% to about 35%, preferably from about 20% to about 30%, of the radius of the exhaust filter element.

Figure 3:
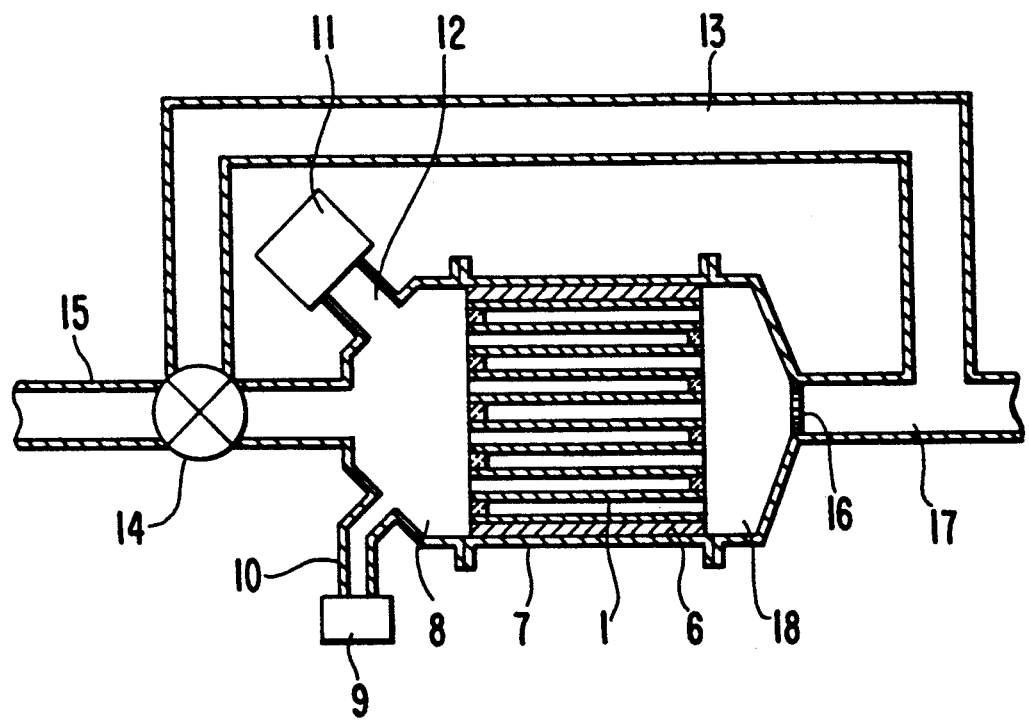
FIG. 3 is a schematic sectional view of an exhaust gas-treating apparatus according to one embodiment of the present invention.

A schematic sectional view of one embodiment of the gas treating apparatus using the exhaust filter element 1 according to the present invention is illustrated in FIG. 3. An exhaust filter element 1 is disposed in a case 7 provided between an inflow chamber 8 and a discharge chamber 18. A micro wave generator 11 is mounted on the inflow side.

The micro wave generator 11 may be used at, for instance, 2.45 GHe with about 200 W to about 1200 W as input.

With the above-described construction, the dielectric constant of a portion where a large amount of soot in an exhaust gas is collected, in particular a portion of the inflow side, of the filter element is increased, so that the micro wave can be concentrated on said portion where a large quantity of soot is collected at the time of regeneration of the filter by incinerating the soot.

In addition, in case of a honeycomb filter element, the irradiation with the micro wave begins the heating from the central portion of said filter element while at the vicinity of an outer circumference of the filter element it is difficult to rise the temperature due to a removal of heat toward a cushion material and the like, so that the particulates accumulated on this portion may not be incinerated and may remain. As a result of the central portion being heated, the filter element is liable to be cracked due to a great thermal stress resulting from a temperature gradient in said outer circumferential portion, and damaged. These problems can be solved by using a material having a dielectric constant higher than that of the inside material in the outer circumferential portion.

Furthermore, the generation of cracks and the like due to the localization of heat can be prevented by gradually reducing the dielectric constant toward the inside.

The exhaust filter element, the method of producing the same and the exhaust gas-treating apparatus according to the present invention are illustrated with reference to the following Examples.

EXAMPLE 1

20 parts by weight of aluminosilicate fiber having a mean diameter of about 3 μm and chopped in a length of 0.1 to 10 mm were sufficiently dispersed in 1000 parts by weight of water to obtain a suspension. In addition, 15 parts by weight of selisite clay as a ceramic raw material powder were suspended in 50 parts by weight of water. The fibrous suspension and the suspension of the ceramic raw material powder were mixed with stirring. Subsequently, 1 part by weight of a vinyl acetate-acrylonitrile copolymer emulsion as an organic binding agent was added and sufficiently mixed with stirring, followed by adding a high molecular coagulant to agglutinate the aluminosilicate fibers, the selisite clay and the organic biding agent with each other to give a flock-like suspension. The obtained flock-like suspension was diluted with water to 3000 parts by weight and then subjected to a paper-manufacturing process in the Fourdinier paper machine to produce a sheet.

In addition, 10 parts by weight of pulverized aluminosilicate fiber, 15 parts by weight of selisite clay and 12 parts by weight of silicon carbide whisker were kneaded together with an aqueous solution of polyvinylalcohol to obtain a pasty plug raw material A; and 20 parts by weight of aluminosilicate and 15 parts by weight of selisite clay were kneaded in the same manner to obtain a pasty plug raw material B.

The obtained sheet was longitudinally into two parts and one of them was shaped into corrugated shape in a corrugating machine having two opposed toothed rolls and simultaneously adhesives obtained by blending said pulverized aluminosilicate fibers and selisite clay were applied to the ridges of the corrugated sheet and the plug raw material A was placed onto one face of the corrugated sheet at one end portion, and the other flat sheet was adhered to the ridges. The above described adhesives were applied to the corrugated ridges on the back face of the above obtained corrugated cardboard-shaped formation by putting the plug raw material B on the back face at the other end portion, and then the resultant sheet was cylindrically would up into a honeycomb-shaped material. This honeycomb-shaped material was assembly of numerous cells; one type of cell was sealed up at the end toward the inflow end for exhaust gas with the plug raw material A, and open at the other end, and the other type of cell was open at the other end of the inflow side and sealed up with the plug raw material B at the other end; and the two types of cell were assembled alternately. Upon firing this formation for 2 hours in an electric furnace heated at 1250° C., organic substances were burnt and the aluminosilicate fibers and selisite clay were sintered to ceramics, by which a filter element having a fibrous ceramic honeycomb structure was obtained. Here, it was observed that a plug formed by the plug raw material A was sintered to the aluminosilicate fibers and selisite clay in a portion where a surface of said silicon carbide whisker was slightly oxidized to silica, that is the integration was achieved by the compounding. FIG. 1 is a perspective view of this embodiment and FIG. 2 is a schematic sectional view of this embodiment. Reference numeral 1 a designates the body of an exhaust filter element 1 comprising cells 2 composed of a ceramic sheet formed in a corrugated honeycomb shape, said cells 2 being provided with an inflow side plug 3a having the silicon carbide whisker incorporated therein and put in the inflow end of half of the cells and a discharge side plug 4 being alternately arranged. The central portion is core portion 5, on which the corrugated sheet was wound up, and similarly provided with the inflow side plug material A therein.

This exhaust filter element was installed in a regenerating system shown in FIG. 3. The exhaust filter element body 1a was covered with an insulating cushion material 6 made of aluminoscilicate fibers and housed in case 7, an inflow chamber 8 was provided at an inflow side of the case 7 and provided with an air pipe 10 opening thereinto for supplying air by means of an air pump 9 and a wave guide 12 opening thereinto and connected with a micro wave generator 11, and said inflow chamber 8 was further provided with an exhaust gas-introducing pipe 15 having a valve 14 for cutting off exhaust gas and introducing said exhaust gas into a by-pass 13. On the other hand, the exhaust filter element 1 is provided with an exhaust chamber 18 with a discharging pipe 17 having a micro wave-cutting off plate 16 at the inlet end thereof. Said by-pass 13 is opened into said discharging pipe 17. In this regenerating system, the exhaust gas is usually introduced into the inflow chamber 8 through said exhaust gas-introducing pipe 15 and then discharged through the exhaust pipe 17 from said exhaust chamber 18 while removing particulates by means of the exhaust filter element 1.

When a given amount of particulates was accumulated on the exhaust filter body la, said valve 14 was operated to direct the exhaust gas into the by-ass 13 and simultaneously cut off the inflow chamber 8. Successively, said air pump 9 was operated to supply the inflow chamber 8 with air at an appointed flow rate for use in the combustion of particulates. On the other hand, said micro wave generator 11 was also operated to irradiate the exhaust filter element 1 with a micro wave through said wave guide 12. Thus, the incineration of the particulates was started in the vicinity of the center of the exhaust filter body 2a by their own heating. In addition, at the inlet end of the exhaust filter body 1a, the dielectric constant of the plug 3a on the inflow side was increased by the inclusion therein of said silicon carbide whisker, so that heating occurs by the irradiation with a micro wave. The particulates, which are left unincinerated on the end face on the inflow side and its circumference in a conventional exhaust filter element, were incinerated by this heating and thus the exhaust filter element could be perfectly regenerated.

In this embodiment, air was supplied to burn the particulates. Even though the end portion on the inflow side of the exhaust filter element was cooled by this air, the particulates accumulated on the end face and the end portion were perfectly incinerated.

EXAMPLE 2

The suspension obtained by coagulating the mixture of aluminosilicate fibers, selisite clay and the like prepared according to Example 1 is designated a suspension A. On the other hand, a further suspension obtained by coagulating a mixture of 20 parts by weight of aluminosilicate fiber, 12 parts by weight of selisite clay and 9 parts by weight of titanium oxide is designated a suspension B. The paper-manufacturing process was carried out by simultaneously supplying a net with said suspensions A and B from separate supply ports in a Fourdinier paper machine to produce a sheet containing titanium oxide over a given width extending in both side edges of the sheet.

A plug raw material C was prepared in the same manner as the Example 1 except that 14 parts by weight of aluminosilicate fiber, 9 parts by weight of selisite clay and 9 parts by weight of titanium oxide were used.

Figure 4:
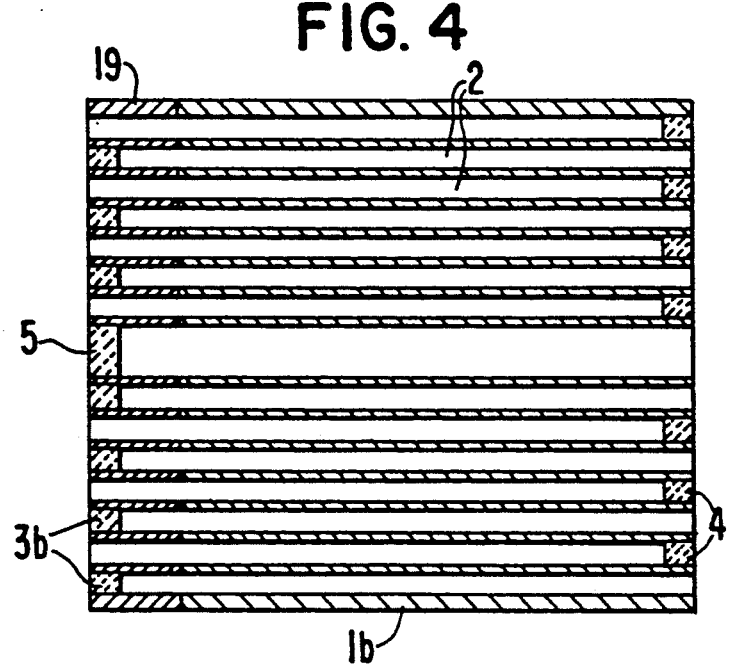
FIG. 4 is a schematic sectional view of an exhaust filter element provided with a portion having a high dielectric constant at an end on the inflow side.

The resulting sheet was longitudinally divided into two parts and said plug raw material C was placed on the side of each part containing the titanium oxide while said plug raw material B was placed on the other side in the same manner as in Example 1, and the sheet was rolled up to obtain an exhaust filter element 1b having a highly dielectric plug 3b on the inflow side shown in FIG. 4. Referring to FIG. 4, reference numeral 19 designates a highly dielectric portion of the body 1a made of a titanium oxide-containing fibrous ceramic prepared from the suspension B.

This exhaust filter element was installed in the regenerating system shown in FIG. 3 in the same manner as in Example 1 and tested with the result that not only the end face on the inflow side but also the inside of the cell could be speedily regenerated in comparison with Example 1.

Because titanium oxide has a high dielectric factor and not only the plug but also the fibrous ceramic of the body 1a is highly dielectric and thus the heating value on the inflow side was remarkably increased. That is to say, heat generated in the plug heated the air supplied and this air promoted the incineration of the particulates accumulated with subsequent heating of fibrous ceramic in Example 1. On the contrary, the fibrous ceramic itself also generated heat, so that the particulates could be directly incinerated in Example 2.

The length of said titanium oxide-containing highly dielectric portion in an exhaust filter element 150 mm long is preferably 15 to 40 mm. The content of titanium oxide in the longitudinal direction of the exhaust filter element was analyzed by the EDX with the result that the mixing of the suspension A and the suspension B was caused with 15 mm during the paper-manufacturing process. Accordingly, the exhaust filter element with the gradually reduced content of titanium oxide can be produced by supplying several batches of suspensions containing titanium oxide is stepwisely reduced amounts, and simultaneously carrying out the paper-manufacturing process.

The highly dielectric material to be incorporated is not limited to silicon carbide whiskers and titanium oxide disclosed in the Examples. Also silicon carbide powders, a zinc oxide whiskers and the like can be used. These dielectric materials exhibit the same results in regeneration as are obtained from the silicon carbide whiskers.

The fibrous ceramic sintered body is a porous ceramic having a structure in which fibrous ceramics are laminated, a porosity of usually 60 to 80% and a remarkably reduced heat capacity, so that the incorporation of the highly dielectric material can easily and sufficiently rise the temperature when irradiated with a micro wave without spoiling the characteristics of the fibrous ceramic.

Accordingly, as to the exhaust filter element of corrugated honeycomb structure obtained by dividing the sheet made of this material into two parts before firing, subjecting one of the resulting two parts to the corrugating process and adhering it to the other part and winding it up, thereby forming a cylindrical corrugated honeycomb, and alternately closing open portions of the resulting cylindrical corrugated honeycombs with the plug material followed by firing, the vicinity of the inflow side can be heated to a high temperature by irradiating with a micro wave as a result of giving a high dielectric constant to in particulate the plug material on the inflow side or a given portion of the corrugated body of the honeycomb at the inflow end. Thus, in the incineration of the particulates by irradiating with a micro wave, even the particulates which are liable to be left unincinerated on the end face on the inflow side and in its vicinity in a conventional device, can be easily incinerated.

EXAMPLE 3

20 parts by weight of aluminosilicate fibers having a mean diameter of 3 μm and chopped in a length of 0.1 to 10 mm were sufficiently dispersed in 1000 parts by weight of water to obtain a suspension. In addition, 15 parts by weight of selisite clay as a ceramic raw material powder were suspended in 50 parts by weight of water. The fibrous suspension obtained was mixed with said suspension of ceramic raw material powders with stirring. Subsequently, 1 part by weight of a vinyl acetate-acrylonitrile copolymer emulsion as an organic binding agent was added to the suspension, and sufficiently mixed with stirring; and then a high molecular coagulant was added thereto to agglutinate the aluminosilicate fibers, selisite clay and organic binding agent with each other to give a flock-like suspension. The agglutinated suspension obtained was diluted with 3000 parts by weight of water and then subjected to a paper-manufacturing process in the usual Fourdinier paper machine to produce a sheet A.

In addition, 10 parts by weight of selisite clay and 8 parts by weight of titanium oxide powder were added to the same suspension as the above-described aluminosilicate fibrous suspension, and the resulting mixture was similarly agglutinated and was subjected to the paper-manufacturing process to produce a titanium oxide-containing sheet B.

In addition, a plug raw material A paste was prepared by mixing 20 parts by weight of pulverized aluminosilicate fibers, 9 parts by weight of selisite clay and 9 parts by weight of titanium oxide with an aqueous solution of polyvinylalcohol; and a plug raw material B paste was prepared using 20 parts by weight of aluminosilicate fibers and 15 parts by weight of selisite clay.

Figure 5:
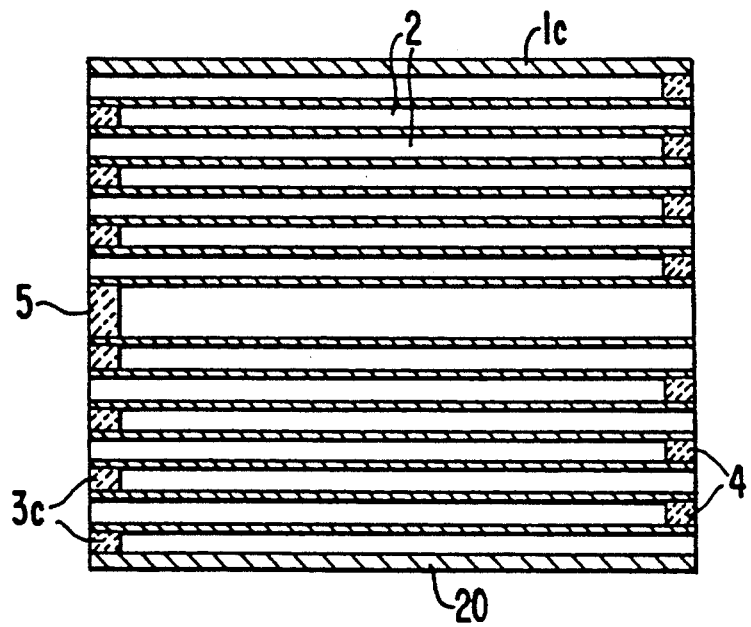
FIG. 5 is a schematic sectional view of an exhaust filter element provided with a portion having a high dielectric constant in an outermost circumferential portion.
Figure 6:
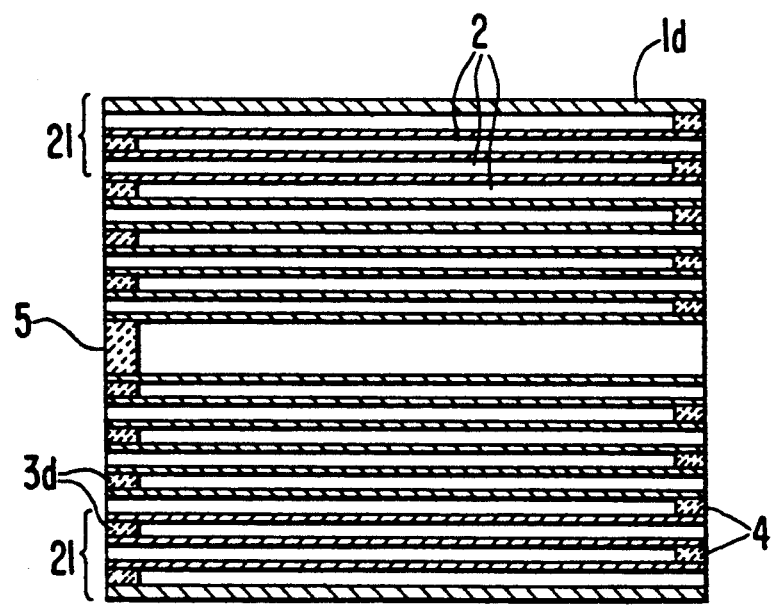
FIG. 6 is a schematic sectional view of an exhaust filter element the outer circumferential portion of which is highly dielectric.

The obtained sheet A was longitudinally divided into two parts and one of them was molded in a corrugated shape in a corrugating machine having two toothed rolls and simultaneously adhesives obtained by blending said pulverized aluminosilicate fibers and selisite clay were applied to the ridges of the one part, and said plug raw material B was placed onto one side face of the corrugated part and the other part of the sheet was adhered thereto. The above-described adhesives were applied to the ridges of the obtained corrugated cardboard-shaped formation and simultaneously the corrugated cardboard-shaped formation was cyndrically would up after placing the above-described plug raw material B onto the other side face, and an outer sheet was provided surrounded by at least one layer of sheet B to obtain a honeycomb-shaped material. This material has a construction in which one end of a half of the formed honeycomb cells is sealed with said plug raw material A on the inflow side of exhaust gas while the other end is open; and the opposite end of the remaining honeycomb cells, which are adjacent to the aforementioned cells, are sealed with the plug raw material B. Upon firing this material at 1250° C. for 2 hours in an electric furnace, the organic substances were burnt and the aluminosilicate fibers and selisite clay were sintered with each other into ceramics, by which a filter element having fibrous ceramic honeycomb structure was obtained. The material composing this exhaust filter element has a porosity of 73% and also the heat capacity at room temperature was small in accordance with said porosity. FIG. 5 is a schematic diagram showing this embodiment. Reference numeral 1c designates an exhaust filter element body comprising cell 2 composed of a ceramic sheet formed into a corrugated honeycomb shape, said filter element body being provided with an inflow end plug 3c including titanium oxide in one end thereof, a discharge end plug 4 in the other end thereof; and titanium oxide-containing fibrous ceramics (high dielectric portion 20) forming an outer shell thereof, and said inflow side plug 3c and said discharge plug 4 being alternately provided. The central portion is a core 5, on which the corrugated cardboard-shaped formation was wound up, and is provided with the inflow side plug material A therein.

Said exhaust filter element 1c was installed in the regenerating system shown in FIG. 3 in the same manner as in Example 1. In this regenerating system, the exhaust gas is usually introduced into the flow chamber 8 through an exhaust gas-introducing pipe 15 and then discharged through an exhaust pipe 17 from an exhaust chamber 18 after removal of particulates by means of the exhaust filter element. When an appointed quantity of particulates was accumulated in the exhaust filter element, the valve 14 was operated to direct the exhaust gas into the by-pass 13 and simultaneously cut off the inflow chamber 8. Successively, an air pump 9 was operated to supply the inflow chamber 8 with air at an appointed flow rate for use in the combustion of particulates. The micro wave generator 11 was also operated to irradiate the exhaust filter element 1c with a micro wave through the wave guide 12. Thus, the incineration of the particulates was started in the vicinity of the center of exhaust filter element by self heating. In addition, at said inflow side plug 3c and said outer shell 20 of the exhaust filter element, the dielectric constant was increased by the incorporation of titanium oxide, so that heating occurred therein during the irradiation with the micro wave. The particulates on the end face on the inflow side, the circumference portion and the outer shell, which are left unincinerated in a conventional device, were incinerated by the conduction of the heat to such particulates and thus the exhaust filter element was completely regenerated.

In this preferred embodiment, air was supplied to burn the particulates. Even though the end portion on the inflow side of the exhaust filter element was cooled by this air, the particulates accumulated on the end face and the end portion were also completely incinerated on account of the generation of heat from the titanium oxide-containing plug.

EXAMPLE 4

A suspension A was obtained by agglutinating a mixture comprising aluminosilicate fibers, and selisite clay in the same manner as in Example 1. On the other hand, 20 parts by weight of aluminosilicate fiber, 10 parts by weight of selisite clay and 6 parts by weight of titanium oxide were mixed and the resulting mixture was agglutinated to obtain a suspension B. Valves provided so as to supply a Fourdinier paper machine with said suspensions A and B, respectively. In this Fourdiniear paper machine, at first the suspension B was supplied to give a sheet having a length sufficient to compose first to third turn laps from an outer side of the exhaust filter element, while the amount of suspension A supplied was gradually increased by gradually changing over both valves, and thereafter only suspension A was supplied by which a paper-like material for one of the exhaust filter element was obtained. Subsequently, the operation was changed over to only the suspension B again. The above-described process was repeated. The resulting sheets each contained titanium oxide in a given section and the content was gradually changed in the pap r-manufacturing direction. Two kinds of sheets, that is, a sheet for use in a corrugated plate and a sheet for use as an uncorrugated plate, were prepared and used for producing an exhaust filter body 1d by the use of the plug raw materials A and B in the same manner as in Example 3.

In said exhaust filter body 1d produced from these sheets, said first to third turns from the outer circumference (highly dielectric portion 21) and a plug 3d on the inflow side were formed of a titanium oxide-containing high dielectric material. The content of titanium oxide was largest in said outer circumference and was gradually reduced toward the third turn. In addition, by changing over the valves for the suspension A and B during the above-described manufacturing process, a sheet, in which the content of titanium oxide was digitally changed, could be produced. Furthermore, even in the case where titanates, such as strontium titanate and calcium titanate, were used in addition to titanium oxide, a composite could be obtained in a similar manner and thus said highly dielectric material could be obtained.

An experiment was carried out by the use of this exhaust filter element in the same manner as in Example 3 with the results that particulates on an end portion on the inflow side and in the vicinity of the outer circumference could be completely incinerated and also a temperature gradient was generated within the exhaust filter element was smaller than that in Example 3. Accordingly, a regenerating system having a longer reliable useful lifetime was provided.

The fibrous ceramic sintered bodies according to the above-described respective Examples are porous ceramics having a structure in which fibrous ceramics are laminated and have characteristics that the porosity is 60 to 80% and the heat capacity is greatly reduced. Accordingly, this material can be easily heated to a high temperature when irradiated with a micro wave without spoiling the characteristics of the fibrous ceramics by incorporating the high dielectric material therein.

What is claimed is:

1. An exhaust filter element having a ceramic honeycomb structure with layers of elongated cells, the layers extending from an outer portion to an inner portion and the cells extending from an inlet end to an outlet end, adjacent cell ends of the honeycomb structure in alternate layers having plugs therein formed of a plug material, said honeycomb structure being made of a material having a higher dielectric constant at at least a portion of the outer portion than at the inner portion, and the higher dielectric constant being sufficient to cause generation of heat in said honeycomb structure material when irradiated with microwaves.

2. An exhaust filter element as claimed in claim 1 in which said higher dielectric constant material is at the inlet end of said honeycomb structure and extending along said honeycomb structure toward the outlet end a predetermined distance less than the length of the honeycomb structure.

3. An exhaust filter element as claimed in claim 1 in which the material of said honeycomb structure has said higher dielectric constant material at the inlet end of said honeycomb structure and the dielectric constant of the material of the honeycomb structure gradually decreases to the outlet end.

4. An exhaust filter element as claimed in claim 1 in which said honeycomb structure is a corrugated honeycomb structure with alternate layers of corrugated plate and uncorrugated plate wound into a cylindrical body, and said higher dielectric constant material being at the inlet end of said honeycomb structure and extending along said honeycomb structure toward the outlet end a predetermined distance less than the length of the honeycomb structure.

5. An exhaust filter element as claimed in claim 1 in which said honeycomb structure is a corrugated honeycomb structure with alternate layers of corrugated plate and uncorrugated plate wound into a cylindrical body, and said higher dielectric constant material being at the inlet end of said honeycomb structure and the dielectric factor of the material of the honeycomb structure gradually decreasing to the outlet end.

6. An exhaust filter element as claimed in claim 1, further comprising an outermost protective layer over the outer layer of said honeycomb structure.

7. An exhaust filter element as claimed in claim 1 in which said filter element is generally cylindrical in shape and said outer portion is constituted by a plurality of layers and the dielectric constant of the material of said plurality of layers is gradually reduced in a radially inward direction of the layers.

8. An exhaust filter element as claimed in claim 1 in which the dielectric constant of the plug material on the inlet end is greater than that of the material of at least a part of said honeycomb structure and being sufficient to cause generation of heat in said plug material when irradiated with microwaves.

9. An exhaust filter element as claimed in claim 8 in which said plug material at the outlet end of said honeycomb structure is composed of the same material as the material of the honeycomb structure other than the portion having the higher dielectric constant, and the plug material at the inlet end of said honeycomb structure is composed of a material having a higher dielectric constant than said same material and sufficient to cause generation of heat in said plug material at the inlet end when irradiated with microwaves.

10. An exhaust filter element having a ceramic honeycomb structure with layers of elongated cells, the layers extending from an outer portion to an inner portion and the cells extending from an inlet end to an outlet end, adjacent cell ends of the honeycomb structure in alternate layers having plugs therein formed of a plug material, said honeycomb structure having several layers from the outer portion inwardly of the honeycomb structure made of a material having a higher dielectric constant than the layers in the inner portion, and the higher dielectric constant being sufficient to cause generation of heat in said honeycomb structure material when irradiated with microwaves; and means for irradiating the exhaust filter element with microwaves.

11. An exhaust filter element of any one of claims 1–10 wherein said ceramic honeycomb structure is composed of heat-resisting inorganic fibers and ceramic raw material powders.

12. An exhaust filter element of claim 11, wherein said heat-resisting inorganic fibers are at least one kind selected from the group consisting of silica fibers, aluminosilicate fibers, alumina fibers and aluminoborosilicate fibers.

13. An exhaust filter element of claim 1 or claim 10, wherein the ceramic structure is composed of a carbide, an oxide or a titanate selected from the group consisting of silicon carbide, titanium oxide, zinc oxide, strontium titanate and barium titanate in addition to the heat-resisting inorganic fibers and said ceramic raw material powders.

14. An exhaust filter element of claim 13, wherein said carbide and oxide to be incorporated are used in the form of whisker or fiber.

15. An exhaust filter element having a ceramic honeycomb structure with layers of elongated cells, the layer extending from the inner portion of said honeycomb structure to an outer portion of said honeycomb structure and the cells extending from an inlet end to an outlet end, adjacent cell ends of the honeycomb structure in alternate layers having plugs therein formed of a plug material, said honeycomb structure being made of a material having a higher dielectric constant at at least a portion of the length of said honeycomb structure at the inlet end than the dielectric constant of the material of the honeycomb structure at the outlet end, and the higher dielectric constant being sufficient to cause generation of heat in said honeycomb structure material when irradiated with microwaves.

* * * * *